(No Model.)
J. E. COLES.
FRUIT LIFTER.
No. 352,736. Patented Nov. 16, 1886.
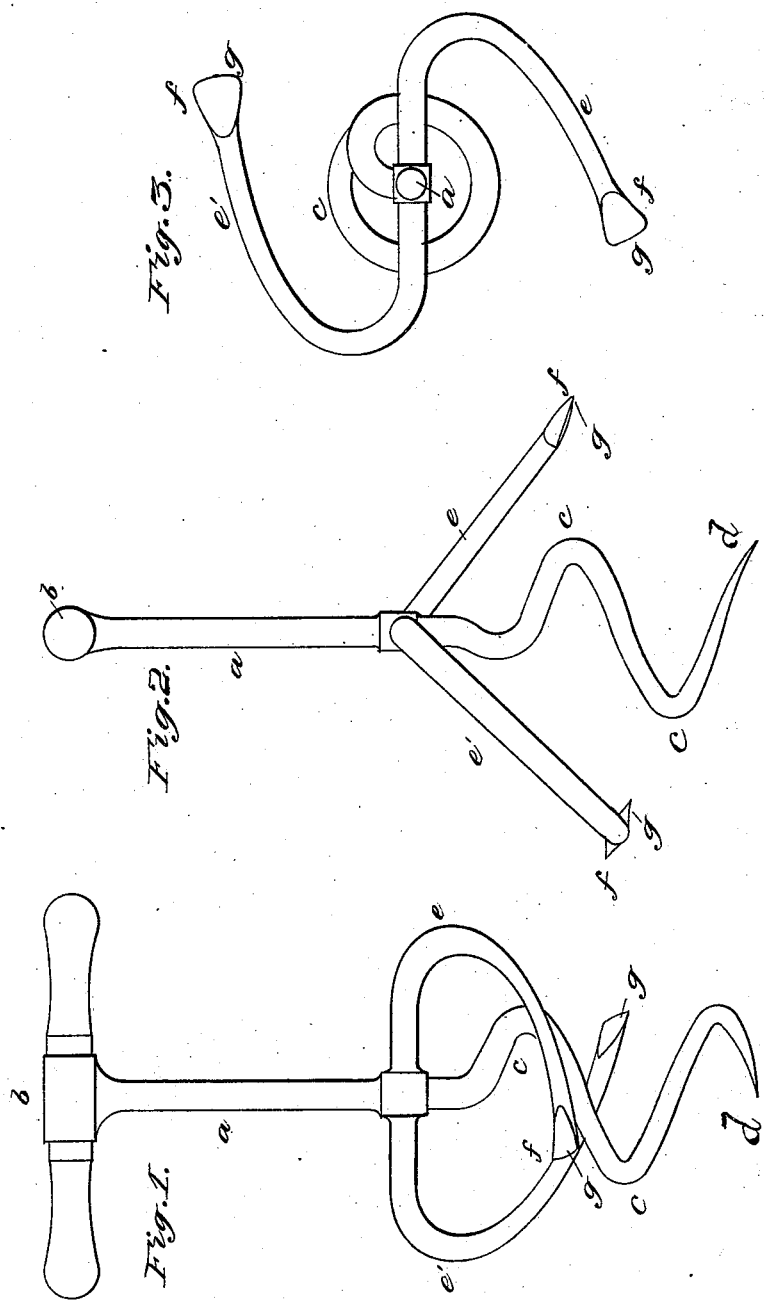
Attest:
Inventor:
John E. Coles
By H. Newell
his Atty.

UNITED STATES PATENT OFFICE.

JOHN E. COLES, OF NEW YORK, N. Y.

FRUIT-LIFTER.

SPECIFICATION forming part of Letters Patent No. 352,736, dated November 16, 1886.

Application filed June 29, 1886. Serial No. 206,643. (No model.)

*To all whom it may concern:*

Be it known that I, JOHN E. COLES, a citizen of the United States, residing at New York, in the county and State of New York, have invented certain new and useful Improvements in Fruit-Lifters, of which the following is a specification.

My invention relates to instruments for loosening and lifting packed fruit in a dried state; and the object of my improvement is to provide an implement which on being forced into the hardened mass will separate or cut it in the form of thin layers, which are readily lifted in solid pieces, and without clogging the instrument.

In the accompanying drawings, which fully serve to illustrate my improvement, Figure 1 represents a front elevation of an implement for cutting and raising dried fruit, constructed according to my invention. Fig. 2 is a side elevation, and Fig. 3 is a top plan view, of the same.

$a$ is a long shank, provided at its upper end with a handle, $b$. The lower end of the shank is formed into two or more coils, $c$, which are of the same diameter, and terminate in a pointed end, $d$. From the shank $a$, above the coiled portion, project two prongs, $e\,e'$. These prongs project horizontally in the same plane from each side of the shank $a$, in the line of the axis of the same, for some distance, then bend on a semicircle, and spread outward from the shaft and from each other; so that the ends or extremities of the prongs stand at the greatest distance from line of the shank $a$, as is clearly shown by Fig. 3. Both of these prongs have flat oval-shaped ends $f\,f$, which are provided with a cutting-edge, $g$. The prong $e'$ is of greater length than the prong $e$, and its cutting end is on a lower plane, (see Fig. 1,) so that in operating the implement one prong will cut at a point below the other.

In operation, the implement is rotated, and as the coil end $c$ is forced into the mass it draws with it the prongs $e\,e'$, which will penetrate on different planes, and thus cut the mass in a layer-like form into two layers of fruit, that are raised as the implement is withdrawn.

I am aware that it is not new, broadly, to provide a fruit-lifting device having a stem spirally formed at its lower end, and provided with curved arms projecting therefrom for the purpose of separating the mass of fruit; but in such former instance referred to the arms are of the same length, and do not lie in different planes horizontally, and, besides, their extremities are turned inward toward the stem, rather than projecting outwardly from the same in opposite directions. My invention differs from the one referred to, in that while the spirally-formed end of the stem is operating to separate the central portion of the mass of fruit, the arms are acting to divide the surrounding portions of the mass in different planes and varying extent, and it is evident therefrom that the mass will be much more quickly and easily divided or loosened.

What I claim as new, and desire to secure by Letters Patent, is—

In a fruit-lifting device of the character described, the combination, with the stem spirally formed at its lower end and provided with suitable operating-handle, of two curved arms secured to and projecting from the stem in opposite directions, the said arms being of varying length and being in different planes horizontally, substantially as shown, and for the purposes set forth.

JOHN E. COLES.

Witnesses:
HERMAN D. LANE,
K. NEWELL.